United States Patent
Dolan et al.

(10) Patent No.: US 8,778,050 B2
(45) Date of Patent: Jul. 15, 2014

(54) HEAVY HYDROCARBON REMOVAL PROCESS

(75) Inventors: William Bachop Dolan, Yardley, PA (US); Roger Wyatt, West Midlands (GB)

(73) Assignee: BASF Corporation, Florham Park, NJ (US)

( * ) Notice: Subject to any disclaimer, the term of this patent is extended or adjusted under 35 U.S.C. 154(b) by 204 days.

(21) Appl. No.: 13/363,699

(22) Filed: Feb. 1, 2012

(65) Prior Publication Data

US 2013/0192299 A1  Aug. 1, 2013

(51) Int. Cl.
*B01D 53/047* (2006.01)

(52) U.S. Cl.
USPC ........ 95/96; 95/106; 95/123; 95/125; 95/143; 585/822

(58) Field of Classification Search
USPC ............. 95/96, 106, 117, 121, 123, 125, 143; 96/132; 585/820, 822
See application file for complete search history.

(56) References Cited

U.S. PATENT DOCUMENTS

| 4,425,142 | A  | * | 1/1984  | Mann .............................. 95/106 |
| 4,749,393 | A  | * | 6/1988  | Rowles et al. .................. 62/627 |
| 5,012,037 | A  | * | 4/1991  | Doshi et al. .................... 585/822 |
| 5,089,034 | A  | * | 2/1992  | Markovs et al. .................. 95/99 |
| 6,103,773 | A  | * | 8/2000  | Wittenbrink et al. ......... 518/702 |
| 6,444,012 | B1 |   | 9/2002  | Dolan et al. |
| 6,497,750 | B2 |   | 12/2002 | Butwell et al. |
| 6,610,124 | B1 |   | 8/2003  | Dolan et al. |
| 7,442,233 | B2 | * | 10/2008 | Mitariten ........................ 95/123 |
| 7,803,215 | B2 | * | 9/2010  | Russell et al. .................. 95/136 |
| 8,268,047 | B2 | * | 9/2012  | Allie .............................. 95/117 |
| 2007/0267328 | A1 |   | 11/2007 | Neumann et al. |
| 2009/0320679 | A1 | * | 12/2009 | Baksh ............................ 95/100 |
| 2012/0079852 | A1 | * | 4/2012  | Northrop et al. ................ 62/620 |

* cited by examiner

*Primary Examiner* — Frank Lawrence, Jr.
(74) *Attorney, Agent, or Firm* — Melanie L. Brown (57) ABSTRACT

A process for removing heavy hydrocarbons from a natural gas stream comprises passing the natural gas stream thought a TSA adsorbent unit to adsorb heavy hydrocarbons, regenerating the TSA adsorbent by heating to form a contaminant-containing gas phase, cooling the contaminated gas phase to separate water and heavy hydrocarbon liquids to form a third gas phase and directing the third gas phase to a PSA unit to adsorb heavy hydrocarbons from the third gas phase. The product from the PSA unit can be sent to pipeline or recycled to the TSA unit for further hydrocarbon removal and recovery.

22 Claims, 5 Drawing Sheets

HEAVY HYDROCARBON REMOVAL PROCESS

FIELD OF THE INVENTION

The invention relates to a process for removing water and hydrocarbons from a natural gas stream.

BACKGROUND OF THE INVENTION

The term "natural gas" is applied to gas produced from underground accumulations of widely varying composition. The main constituent of natural gas is methane. Apart from methane, natural gas generally includes other hydrocarbons, nitrogen, carbon dioxide, sometimes a small proportion of hydrogen sulphide, and often water. Hydrocarbon constituents include ethane ($C_2$), propane ($C_3$), butane ($C_4$), pentane ($C_5$), hexane ($C_6$), heptane ($C_7$), etc. Hydrocarbons having 5 or more carbon atoms are generally referred to as $C_{5+}$. Constituents of a natural gas stream other than methane will be referred to as contaminants in the specification and in the claims. The invention relates in particular to the removal of contaminants by a combination of adsorption and condensation.

The lighter constituents, $C_1$ up to and including $C_4$, are in gaseous phase at atmospheric temperatures and pressures. The heavier constituents, $C_{5+}$, are in gaseous phase when at elevated temperatures during production from the subsurface and in liquid phase when the gas mixture has cooled down. Natural gas containing such heavier constituents is known as "wet gas" as distinct from dry gas containing none or only a small proportion of liquid hydrocarbons.

The removal of contaminants, in particular water and hydrocarbons, from natural gas streams is important to prevent problems that can occur during their transportation. In the event that untreated natural gas is transported through pipeline systems the pressure loss, which is inevitable in pipeline systems, causes liquids to be formed as a result of condensation of water and/or hydrocarbons. Slugs of these liquids can cause problems, such as plugging of pipelines and distribution systems. In addition, liquid water can accelerate corrosion.

A useful parameter for indicating the potential liquids content of any gas is in terms of the dewpoint. The dewpoint is generally defined as the temperature to which a gas must be cooled (at constant composition) in order for it to become saturated with respect to water vapour (i.e. attain equilibrium with a liquid). For mixtures such as natural gas, instead of a dewpoint the cricondenbar (highest pressure at which a vapour-liquid equilibrium is present) or cricondentherm (highest temperature at which a vapour-liquid equilibrium is present) are used.

In order to prevent the formation of liquids in a natural gas stream, contaminants, in particular water and, if applicable, hydrocarbons should be removed in order to lower the cricondentherm of the natural gas stream. In the case of natural gas with a low content of hydrocarbons other than methane, or in the case when hydrocarbon liquid formation is allowable, only water removal is required. Generally, however, there is a need for the removal of both water and hydrocarbons, which are more difficult to remove, from the natural gas, especially to achieve a certain desired cricondentherm.

A known process for the removal of water and hydrocarbons from a natural gas stream is for example described in the article "Solving storage problems" by T. Schulz, J. Rajani, D. Brands, Hydrocarbon Engineering June 2001, pages 55-60. In the known process, the natural gas stream is contacted with an adsorbent bed in order to remove the water and hydrocarbon contaminants. After some time on stream the adsorption bed needs to be regenerated, which time also depends on the desired quality of the purified gas stream leaving the adsorbent bed because of preferential adsorption of different types of contaminants.

Adsorption of components from a gas mixture through solid adsorbents is a thermal exothermic process, known as thermal swing adsorption (TSA). This process is generally reverted by applying heat to the adsorbent and adsorbate phase. If the heat applied is sufficient, the adsorbed components will leave the adsorbent internal surface and pores. To complete regeneration, the adsorbent is once again cooled to its initial temperature. This reversion of the adsorption process is called regeneration.

Therefore in total three adsorption beds are provided in the known process, one of them being in adsorption mode, one of them being regenerated by passing a slipstream of the untreated natural gas stream at an elevated temperature over the bed so that adsorbed contaminants are removed from the bed, and one of them being cooled by the slipstream after the bed was regenerated. The slipstream is first passed through the bed to be cooled, then heated, and passed through the bed to be regenerated. The slipstream takes up contaminants that are removed from the adsorbent bed in regeneration mode. The contaminated slipstream is then passed through an air and water cooler, so that contaminants that condense at the temperature of water (above hydrate formation temperature) can be separated off as a liquid in a separator. The flash gas is recycled to the natural gas stream to be treated, upstream of adsorption bed in adsorption mode. Unfortunately, the water cooler and separator are not very efficient. Accordingly, significant levels of $C_{5+}$ hydrocarbon contaminants can build up in the recycle stream to the adsorption bed, reducing adsorption efficiency. Alternatively, cooling with a refrigerant is also problematic solid hydrates can form in the cooler and knock out pots.

A problem in the use of adsorbent beds to remove water and/or hydrocarbons from a natural gas stream is that it is not always possible to achieve a sufficiently low cricondentherm of the resulting purified gas stream from the bed in adsorption mode. Therefore, there is a need for a process enabling the removal of contaminants, typically both water and hydrocarbons, from the natural gas, to achieve a certain desired cricondentherm.

In accordance with U.S. Pub. No. 2007/0267328, published Nov. 22, 2007, a process is provided for removing contaminants from a natural gas stream. The process comprises the steps of: (a) contacting part of the natural gas stream as a first gas stream at an elevated temperature with a first adsorbent bed in regeneration mode, to remove contaminants present on the first adsorbent bed, and to obtain a second gas stream that is enriched in contaminants compared to the first gas stream; (b) submitting the second gas stream to a gas/liquid separation step comprising cooling the second gas stream to a temperature such that at least some contaminants begin to condense into a first liquid phase that is rich in contaminants, and separating the first liquid phase from the second gas stream to create a third gas stream; wherein the gas/liquid separation step forms a first gas/liquid separation step, and wherein the process further comprises (c) submitting the third gas stream to a second gas/liquid separation step to obtain a second liquid phase that is rich in contaminants, and a lean gas stream.

In a particularly advantageous embodiment of the process according to U.S. Pub. No. 2007/0267328, the second gas/liquid separation in step (c) is effected by means of an accelerated velocity inertia separator. Such a separator creates a fluid stream flowing at accelerated velocity and causes said fluid stream to cool to a temperature at which water and hydrocarbons will condense into a second liquid water/hydrocarbon phase. The accelerated velocity inertia separator is advantageously a supersonic inertia separator and the fluid stream flows at supersonic velocity. Further, a swirling motion can suitably be induced to the fluid stream flowing at supersonic velocity, thereby causing the contaminants, in particular water and hydrocarbons, to flow to a radially outer section of a collecting zone in the stream. However, after leaving the accelerated velocity inertia separator, the gas stream must be compressed to adsorption pressure. The compression step reduces the energy efficiency of the process.

SUMMARY OF THE INVENTION

The present invention provides a process for removing water and hydrocarbons from a natural gas stream, and which has improved process efficiencies over the processes of the prior art. The process for removing water and heavy hydrocarbon contaminants from natural gas streams comprises a thermal swing adsorption process, as in the prior art, in which the natural gas stream is directed to an adsorbent bed to remove contaminants from the natural gas stream. The adsorption bed is regenerated by heat in which the contaminants are released from the adsorbent and passed to a gas/liquid separation step, which involves cooling the contaminant gas stream for condensation into a liquid phase that is rich in contaminants. Instead of recycling the gas phase which results from the gas/liquid separation to the adsorbent bed, the gas phase is passed to a pressure swing adsorption process in which the contaminants, including heaving hydrocarbons, are adsorbed in the bed and a clean natural gas stream is formed. Upon regenerating the pressure swing adsorption bed by reducing pressure, the low pressure contaminant stream is used as a fuel to provide heat for the regeneration mode of the thermal swing adsorption bed. The present invention is also directed to variations on the process in which the product and contaminant streams from the pressure swing adsorption process can be recycled or treated for further separations.

The process and system according to the invention allows, in addition to the removal of water, the removal of hydrocarbons from the feed gas stream, resulting in a lower cricondentherm compared to the feed gas stream. In the process according to the invention, the extent of removal of water and hydrocarbons from the feed gas stream can be steered, thereby creating a product gas stream with a desired cricondentherm, even in cases where the composition of the feed gas stream is such that a lowering of the cricondentherm to a sufficiently low level could not have been achieved using other techniques such as the process using only adsorption.

The process of the present invention alleviates the problems found in the prior art in which the gas from the gas-liquid separator was recycled to the thermal swing adsorption unit, and wherein continuous recycle resulted in a build-up of heavy hydrocarbons in the adsorption process due to the inherent inefficiency of the gas-liquid separation unit. The use of the pressure swing adsorption unit effectively removes the heavy hydrocarbon contaminants from the contaminant stream leaving the thermal swing adsorption unit. Any recycled gas from the pressure swing adsorption unit has a significantly lower heavy hydrocarbon content than the gas from the condenser or gas/liquid separator. Moreover, any recycle gas from the PSA unit into the thermal swing adsorption unit for further adsorption of contaminants is at the higher pressure of the product gas from the pressure swing adsorption and, therefore, improves on the efficiency of U.S. Pub. No. 2007/0267328 in which the gas phase from the gas-liquid separator was accelerated due to a pressure drop, and then had to be compressed to meet the feed pressure of the thermal swing adsorption unit.

DETAILED DESCRIPTION OF THE INVENTION

The composition of the natural gas stream to be treated can vary. Typically, the natural gas stream comprises water in concentrations in the range of from 0.01 to 4 mol %, preferably from 0.05 to 2 mol %. The concentration of $C_2$, $C_3$ and $C_4$ hydrocarbons in the feed gas stream is typically in the range of from 0.4 to 4 mol %, in particular from 1.0 to 3 mol %. The concentration of $C_{5+}$ hydrocarbons in the feed gas stream is typically in the range of from 0.05 to 5 mol %, in particular from 0.1 to 3 mol %, based on the feed gas stream.

Suitably, the treated gas stream has a cricondentherm lower than that of the natural gas feedstream, preferably at least 10° C. lower, more preferably at least 15° C. lower, most preferably at least 20° C. lower. In absolute terms, the treated gas stream to be sent to pipeline will have a cricondentherm below 10° C., preferably below 6° C., more preferably, below 0° C., most preferably, below −5° C.

Figure 1:
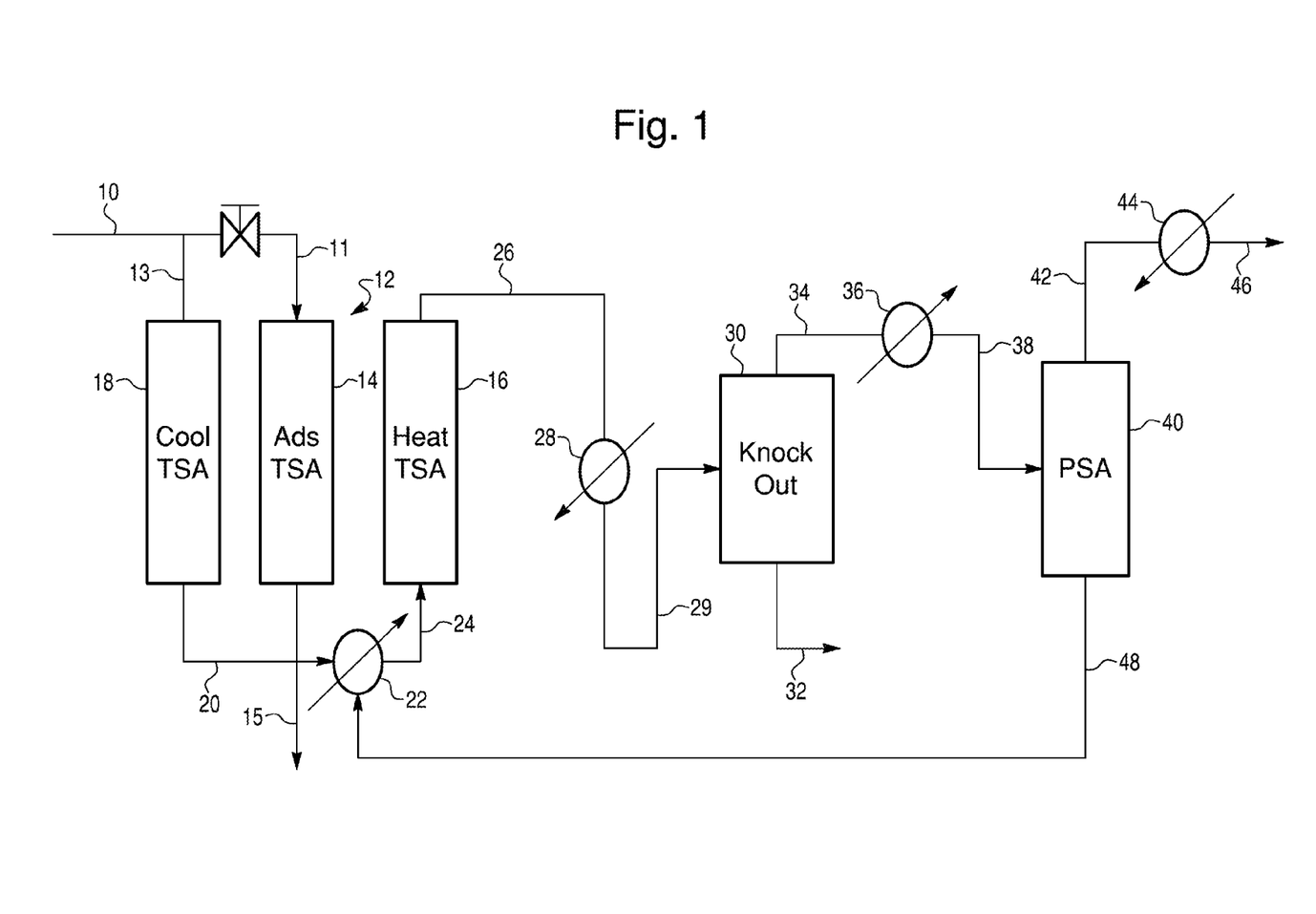
FIG. 1 is a schematic of the process of this invention for removing water and hydrocarbons from a natural gas stream, showing the combination of thermal swing adsorption, gas/liquid separation and pressure swing adsorption.

The natural gas feedstream, such as described above and shown in FIG. 1 as reference numeral 10, is directed to the thermal swing adsorption unit (TSA unit) 12. The TSA unit 12 includes one or more beds which are alternatively processed through an adsorption stage, a regeneration stage, and a cooling stage. In FIG. 1, the adsorption stage is indicated by reference numeral 14, the regeneration stage indicated by reference numeral 16, and the cooling stage indicated by reference numeral 18. The feedstream 10 enters the adsorption stage 14 via line 11. Adsorption stage 18 includes a particulate adsorbent which can adsorb water, and the heavy hydrocarbons, including the $C_{5+}$ hydrocarbons from the feedstream 10. Inlet temperature of the adsorption stage can range from about 5 to 100° C., preferred about 15 to 60° C., and 20 to 30° C. also exemplified. Pressures of 200 to 1400 psia, preferred 600 to 1200 psia, and further exemplified by 800 to 1000 psia can be used. A product stream 15 leaves TSA adsorbent bed 14, having a vastly reduced heavy hydrocarbon and water content than feedstream 10. A portion of the feedstream 10 can also be used to cool the adsorbent in stage 18 via line 13, subsequent to adsorption and then regeneration. Thus, once the adsorbent in stage 14 has been heated and the adsorbent releases the contaminants therefrom, the stage now has to be cooled and readied for the adsorption stage. Inlet temperatures of the cooling stage can range from 5 to 100° C., preferred about 15 to 60° C., and 20 to 30° C. also exemplified. Pressures of 200 to 1400 psia, preferred 600 to 1200 psia, and further exemplified 800 to 1000 psia can be used. The regeneration stage involves heating the adsorbent, so that the adsorbent releases the heavy hydrocarbons. Heating is accomplished by directing the feedstream which has passed through the cooling unit 18 and directing the feedstream from unit 18 via line 20 to boiler 22. In boiler 22, the feedstream is heated and directed to the regeneration unit 16 via line 24. Inlet temperatures of the regeneration stage can range from about 200 to 350° C., preferred about 200 to 300° C., and 270 to 290° C. also exemplified. Pressures of 200 to 1400 psia, preferred 600 to 1200 psia, and further exemplified by 800 to 1000 psia can be used.

Suitable adsorbents are solids having a microscopic structure. The internal surface of such adsorbents is preferably between 100 and 2000 $m^2/g$, more preferably between 500 and 1500 $m^2/g$. The nature of the internal surface of the adsorbent in the adsorbent bed is such that water and $C_{5+}$ hydrocarbons are adsorbed. Suitably, the internal surface of the adsorbent is polar. Suitable adsorbent materials include materials based on silica, silica gel, alumina or silica-alumina. Zeolite type adsorbents are preferred.

Generally, in the adsorbent bed water is preferentially adsorbed over hydrocarbons. $C_{5+}$ hydrocarbons, hydrocarbons having 5 or more carbon atoms, will generally be preferentially adsorbed over lighter hydrocarbons such as $C_2$, $C_3$ or $C_4$. Typically, water is adsorbed to the extent that the resulting concentrations are in the range of from 0.001 to 0.5 mol %, in particular from 0.01 to 0.4 mol %, more in particular 0.05 to 0.2 mol %. Typically, $C_{5+}$ hydrocarbons are adsorbed to the extent that the resulting concentrations are in the range of from 0.01 to 1 mol %, in particular from 0.05 to 0.5 mol %.

Regenerating the adsorbent bed 16, results in an increase in the relative contaminant content of the gas stream 26 leaving the bed, as compared to the relative containment content of natural gas feedstream 10 entering the adsorption bed 14. Although in this way the adsorbent bed can be regenerated, the regeneration gas 26 now is of worse quality than the original natural gas stream 10. This is a problem since it is generally desired to recycle the regeneration gas stream to an adsorbent bed in adsorption mode. In the prior art, this problem is solved by cooling the regeneration gas in an air and water cooler, so as to condense part of the contaminants into a liquid phase, and by separating the liquid phase from the regeneration gas.

Thus, the gas stream 26 is cooled in condenser 28 to a temperature such that at least some water and some hydrocarbons will begin to condense into a liquid water/hydrocarbon phase. The cooling temperature can be adjusted and depends on the temperature of gas stream 26. Typically cooling is done by means of an air and/or water cooler, and cooling temperatures are typical air or water temperatures, in particular above the hydrate temperature, such as above the range of from 0 to +20° C. Inlet temperatures of the coolers can range from about 5 to 60° C., preferred about 15 to 35° C., and 20 to 35° C. also exemplified. Pressures of 200 to 1400 psia, preferred 600 to 1200 psia, and further exemplified by 800 to 1000 psia can be used. Condensation or separation of the water and heavy hydrocarbons from the gas phase takes place in separator 30, which receives the cooled stream 29 from condenser 28. Preferably, between 0.5% and 90% of the water and hydrocarbon contaminants will condense, more preferably between 1.0% and 80%, based on the total water and hydrocarbon contaminants present in the gaseous phase in the gas stream.

The liquid water and heavy hydrocarbons ($C_{5+}$) are separated from the cooled stream 29 in knock out or separator 30, and discharged via line 32. A gas stream 34, mostly of $C_1$-$C_4$ hydrocarbons and depleted of water and $C_{5+}$ contaminants, leaves separator 30. In the prior art systems, the gas stream 34 was recycled to the adsorbent bed 14 for further removal of the heavy hydrocarbons, which remained. As previously stated, however, the condenser 28 and knock out 30 are not overly efficient and, accordingly, significant levels of $C_{5+}$ hydrocarbon contaminants can remain in gas phase 34. Continuous recycle of stream 34 to the adsorbent bed would overload the adsorbent, requiring the adsorbent to be regenerated more frequently, or requiring an increase in size of the adsorbent bed. Regardless of whether the bed is made larger or the adsorbent is regenerated more frequently the amount of regeneration gas will be increased, consequently increasing the amount of effective recycle.

In accordance with the present invention, the gas stream 34 which is obtained from the gas/liquid separation in knock out 30 is further treated to remove the heavy hydrocarbons therefrom. Subsequent to treatment, the gas phase can then be sent to the pipeline, or recycled back to the adsorbent bed without the previous difficulties of over burdening the adsorbent bed. Referring again to FIG. 1, the gas phase 34 which is separated from knock out 30 is heated in heater 36, and the heated gas phase via line 38 is sent to a PSA unit 40. As shown in FIG. 1, PSA unit 40 represents a PSA system in which one or typically a plurality of beds of an adsorbent are utilized. Similar to the TSA system, each bed of the PSA system operates on a sequential pressurization/adsorption and a depressurization/regeneration cycle. PSA processes are typically carried out in multi-bed systems as illustrated in U.S. Pat. No. 3,430,418 to Wagner, which describes a system having at least four beds. As is generally known and described in this patent, the PSA process is commonly performed in a cycle of a processing sequence that includes in each bed: (1) higher pressure adsorption with release of product effluent from the product end of the bed; (2) co-current depressurization to intermediate pressure with release of void space gas from the product end thereof; (3) countercurrent depressurization to a lower pressure; (4) purge; and (5) pressurization. The void space gas released during the co-current depressurization step is commonly employed for pressure equalization purposes and to provide purge gas to a bed at its lower desorption pressure. Suitably, the internal surface of the adsorbent is polar. Suitable adsorbent materials include materials based on silica, silica gel, alumina or silica-alumina and zeolite type adsorbents. In general, inlet temperatures of the PSA adsorption stage can range from about 65 to 200° C., preferred about 125 to 175° C., and 150 to 160° C. also exemplified. Pressures of 200 to 1400 psia, preferred 500 to 1200 psia, and further exemplified 800 to 1000 psia can be used. Pressures of 2 to 100 psia, preferred 5 to 30 psia, and further exemplified by 10 to 20 psia can be used for the purge stage.

Again, referring to FIG. 1, the product gas from PSA system 40 leaves via line 42, having a substantially lower heavy hydrocarbon content than gas stream 26 and the gas phase 34. Line 42 can be directly sent to the pipeline or cooled by condenser 44 to knock out further water or heavy liquid hydrocarbons to yield a clean gas phase 46, which can then be directed to the pipeline. The low pressure contaminant gas phase 48, from PSA system 40, is formed by depressurizing the adsorbent bed, which represents a regeneration cycle of the PSA. Low pressure gas phase 48 can be used as fuel to heat boiler 22 for regeneration of the TSA adsorbent.

Figure 2:
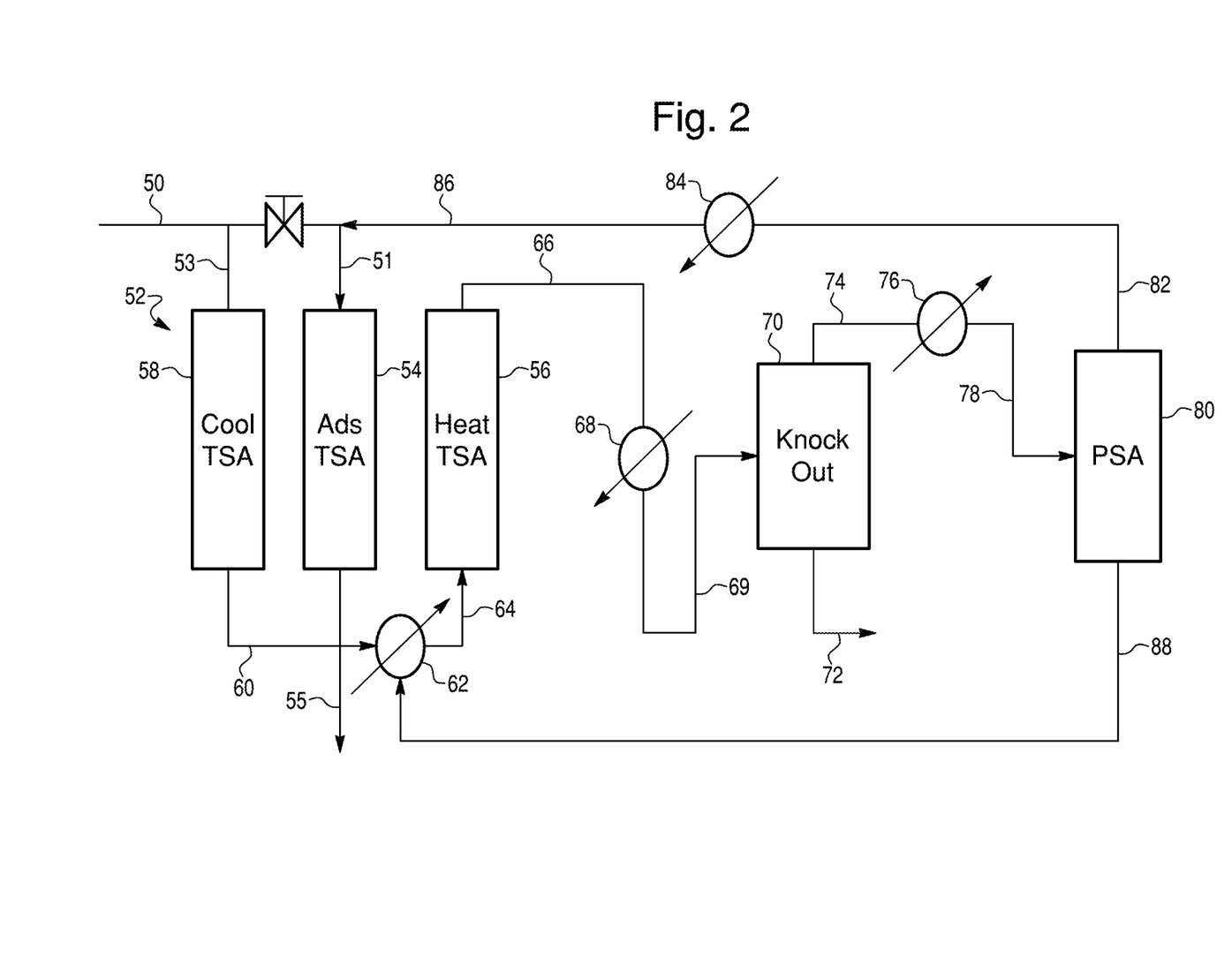
FIG. 2 is a schematic of the process of this invention for removing water and hydrocarbons from a natural gas stream, showing the combination of thermal swing adsorption, gas/liquid separation and pressure swing adsorption in which the contaminant stream from the PSA unit is used as a fuel to regenerate the TSA unit, and the product from the PSA unit is recycled to the TSA unit for further contaminant reduction.

FIG. 2 represents an alternative process to that shown in FIG. 1, although the TSA process and gas/liquid phase knock out units are the same for each process. The natural gas feedstream 50 is directed to the thermal swing adsorption unit (TSA unit) 52. The TSA unit 52 includes one or more beds which are alternatively processed through an adsorption stage, a regeneration stage, and a cooling stage. In FIG. 2, the adsorption stage is indicated by reference numeral 54, the regeneration stage indicated by reference numeral 56, and the cooling stage indicated by reference numeral 58. The feedstream 50 enters the adsorption stage 54 via line 51. Adsorption stage 54 includes a particulate adsorbent, as disclosed above, which can adsorb water, and the heavy hydrocarbons, including the $C_{5+}$ hydrocarbons from the feedstream 50. A product stream 55 leaves TSA adsorbent bed 54, having a reduced heavy hydrocarbon and water content than feedstream 50. A portion of the feedstream 50 can also be used to cool the adsorbent in stage 58 via line 53, subsequent to adsorption and then regeneration, as above described. The regeneration stage involves heating the adsorbent, so that the adsorbent releases the heavy hydrocarbons. Heating is accomplished by directing the feedstream which has passed through the cooling unit 58 and is directed from unit 58 via line 60 to boiler 62. In boiler 62, the feedstream is heated and directed to the regeneration unit 56 via line 64.

In regeneration unit 56, the heated adsorbent releases the adsorbed water and hydrocarbons, which are removed via line 66. Line 66 has a vastly higher concentration of water and heavy hydrocarbons than feedstream 50. The gas stream 66 is cooled, as described with respect to FIG. 1, in condenser 68 to a temperature such that at least some water and some hydrocarbons will begin to condense into a liquid water/hydrocarbon phase. Condensation or separation of the water and heavy hydrocarbons from the gas phase takes place in separator 70, which receives the cooled stream 69 from condenser 68.

The liquid water/hydrocarbon phase is separated from the gas stream in knock out or separator 70, and discharged via line 72. A gas stream 74 depleted of contaminants leaves separator 70. Gas stream 74 is directed to a PSA unit 80 which operates in the same manner as the PSA unit 40, as described with respect to FIG. 1. Thus, the gas stream 74 which contains heavy hydrocarbons in the form of $C_{5+}$ hydrocarbons is heated in heater 76 and the gas stream directed to PSA process 80 via line 78. PSA system 80 includes an adsorbent bed, which includes an adsorbent selective to the heavy hydrocarbons. A high pressure product stream 82 leaves PSA process 80 via the adsorbent bed of PSA process 80, having substantially less heavy hydrocarbons than process streams 66, 74 and 78. Accordingly, the product 82 can be cooled in cooler 84 and sent via line 86 for recycle to the adsorbent bed 54 of the TSA process. Inasmuch as stream 86 has a reduced heavy hydrocarbon content due to the adsorption in the PSA unit 80, the recycle into the TSA adsorbent unit does not over burden the unit, as in the prior art. Like FIG. 1, the low pressure contaminant phase 88 from PSA unit 80 can be used as a fuel for boiler 62.

Figure 3:
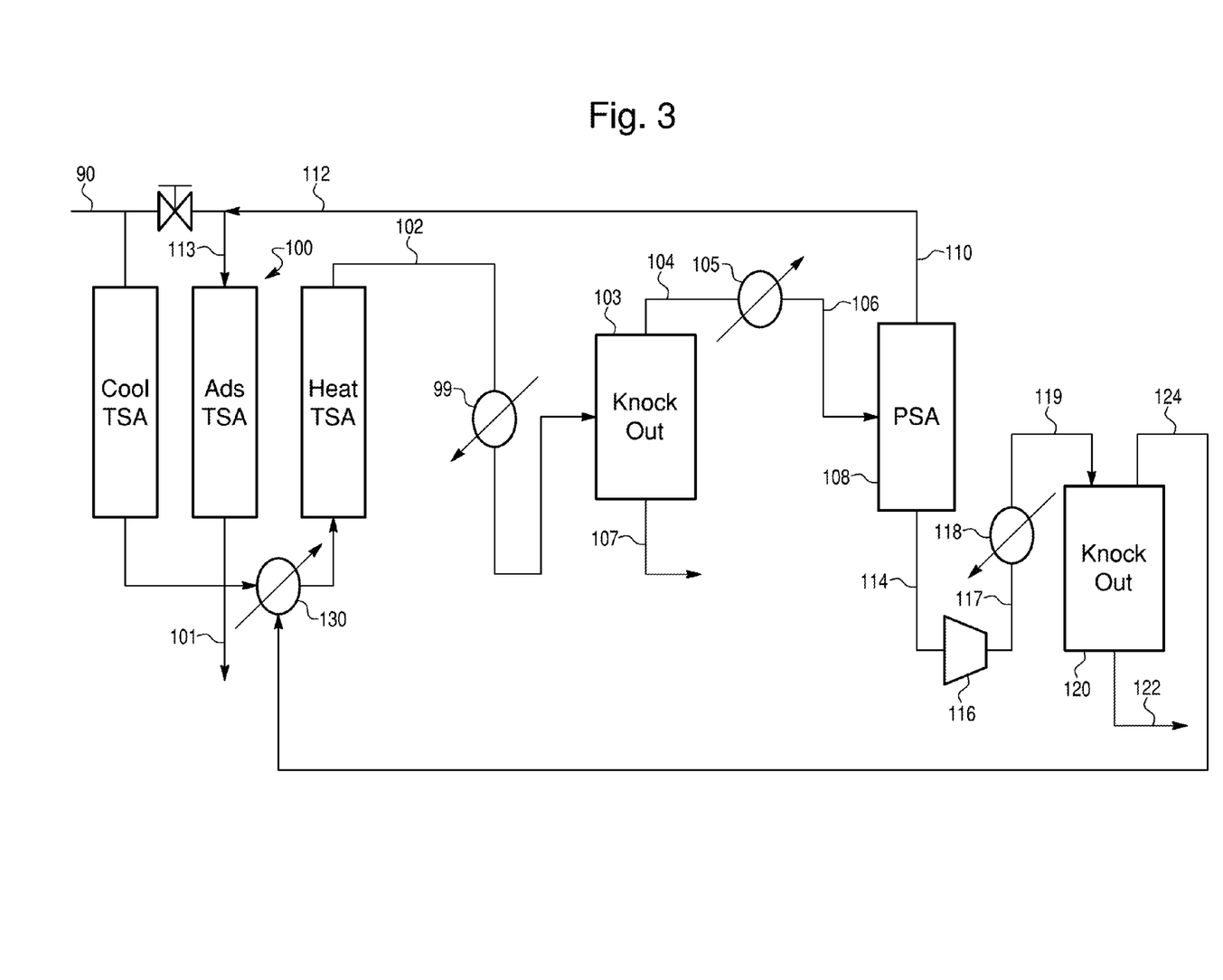
FIG. 3 is a schematic of an alternative process of this invention for removing water and hydrocarbons from a natural gas stream, showing the combination of thermal swing adsorption, gas/liquid separation and pressure swing adsorption in which the contaminant stream from the PSA unit is directed to a gas/liquid separator prior to being used as a fuel for regenerating the TSA unit.

FIG. 3 depicts still another alternative process which falls within the scope of the present invention. As in FIGS. 1 and 2, the process of FIG. 3 involves treating a natural gas feedstream with a combination process of TSA and a gas/liquid separation. As in FIGS. 1 and 2, a natural gas feedstream 90 is treated by a TSA process 100 to yield a clean product gas 101, and a water/$C_{5+}$ hydrocarbon concentrated stream 102. A condenser 99 and a gas/liquid separator 103 treats the stream 102, to yield a product gas phase 104, which still contains contaminant heavy hydrocarbons which have been desorbed from the TSA unit 100 during regeneration. A liquid water/heavy hydrocarbon stream 107 is also removed from separator 103. As in the process shown in FIGS. 1 and 2, the product gas phase 104 is heated in heater 105 and forwarded via line 106 to PSA unit 108. The product gas 110 leaving the PSA unit 108 is greatly reduced in heavy hydrocarbons, which have been adsorbed in the PSA unit. The adsorbent is as disclosed previously and is more selective to water and C5+ hydrocarbons than lighter hydrocarbons, i.e. $C_1$-$C_4$. Accordingly, the product gas 110 can be recycled directly into the TSA adsorbing unit via lines 112 and 113 without overburdening the adsorbent in TSA unit 100. The low pressure contaminant gas phase from PSA unit 108 leaves via line 114 and is rich in water and heavy hydrocarbons. In this embodiment, the low pressure contaminant gas stream is pressurized in compressor 116 and directed via line 117 to condenser 118, and via line 119 to separator 120, wherein water and heavy hydrocarbons are further separated from the gas phase constituents $C_1$-$C_4$ hydrocarbons in separator 120, and leave separator 120 as liquid stream 122. The gas phase from separator 120 leaves via line 124, and can be used as a fuel in the boiler 130 of the TSA unit 100. Thus, liquid hydrocarbons of $C_{5+}$ are removed from lines 107 and 122 from separators 103 and 120, respectively, and can be recovered for chemical value.

Figure 4:
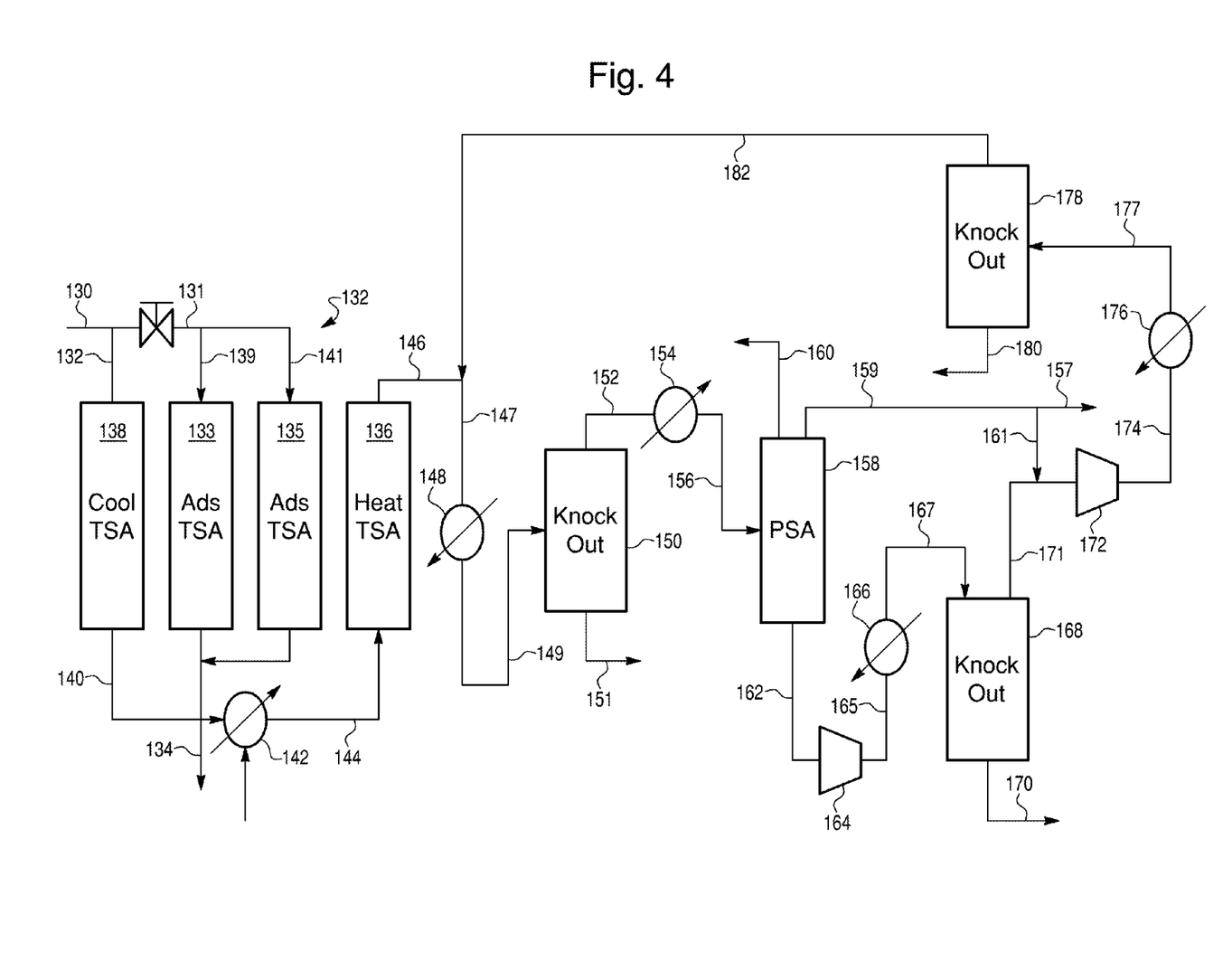
FIG. 4 is a schematic of still another alternative process for removing water and hydrocarbons from a natural gas stream, illustrating the combination of TSA, gas/liquid separation and PSA unit in which the contaminant stream from the PSA unit undergoes further gas/liquid separation.

FIG. 4 represents still yet another alternative to the process of this invention. A natural gas feedstream 130 is passed through a TSA unit 132 to remove the bulk of the water and heavy hydrocarbons from the feedstream and produce a product gas 134 that can be sent to pipeline. The TSA unit 132 includes one or more beds which are alternatively processed through an adsorption stage, a regeneration stage, and a cooling stage. In FIG. 4, the adsorption stage is indicated by two beds run in parallel, 133 and 135, the regeneration stage indicated by reference numeral 136, and the cooling stage indicated by reference numeral 138. The feedstream 130 enters the adsorption stages 133 and 135, either simultaneously or staggered via lines 131, 139 and 141. Adsorption stages 133 and 135 include a particulate adsorbent which can adsorb water, and the heavy hydrocarbons, including the $C_{5+}$ hydrocarbons from the feedstream 130. Inlet temperature and pressure of the adsorption stages are as set forth in the discussion of FIG. 1. A product stream 134 leaves TSA adsorbent beds 133 and 135, having a vastly reduced heavy hydrocarbon and water content than feedstream 130. A portion of the feedstream 130 can also be used to cool the adsorbent in stage 138 via line 137, subsequent to adsorption and then regeneration. Thus, once the adsorbent in stages 133 and 135 have been heated and the adsorbent releases the contaminants therefrom, the stages now have to be cooled and readied for the adsorption stages as previously described. The regeneration stage involves heating the adsorbent, so that the adsorbent releases the heavy hydrocarbons. Heating is accomplished by directing the feedstream which has passed through the cooling unit 138 and directing the feedstream from unit 138 via line 140 to boiler 142. In boiler 142, the feedstream is heated and directed to the regeneration unit 136 via line 144.

The contaminant stream 146 from the TSA unit 132 is formed by regeneration of the adsorbent bed 136 and directed to condenser 148 via line 147, and then separator unit 150 via line 149. Separator 150 provides a gas/liquid separation, in which the liquid contaminants of water and $C_{5+}$ hydrocarbons are removed via line 151, and a gas phase 152 is separated and further treated in accordance with this invention to remove additional heavy hydrocarbon contaminants. Again, the gas phase 152 is heated in heater 154 and directed via line 156 to the PSA unit 158. The product from PSA unit 158, having a reduced level of water and $C_{5+}$ hydrocarbons than stream 156 leaves via line 160 and is directed to pipeline. Optionally, (not shown) line 160 can be recycled to an adsorbent bed of the TSA unit 132. The low pressure contaminant stream 162 from the PSA unit is pressurized in compressor 164, directed via line 165, to condenser 166 and via line 167 to separator 168, in which the heavy liquids are further removed via line 170. In the process shown in FIG. 4, a gas phase 171, leaving separator 168, is pressurized in compressor 172 and directed via line 174 to condenser 176 and separator 178 via line 177 for separation into a $C_{5+}$ liquid phase via line 180 and a gas phase 182 for mixture with the contaminant gas phase 146, leaving the TSA unit 132, subsequent to regeneration of the adsorbent in TSA unit 132. The combined stream 146 and 182 forms stream 147 which is cooled and separated in the separation unit 150. An intermediate pressure product gas phase 159 from PSA unit 158 is taken as fuel stream 157. A portion of gas phase 159 can be directed via line 161 to gas phase 171. In this embodiment, heavy hydrocarbons are recovered from the initial feedstream 130 as lines 151, 170 and 180.

Figure 5:
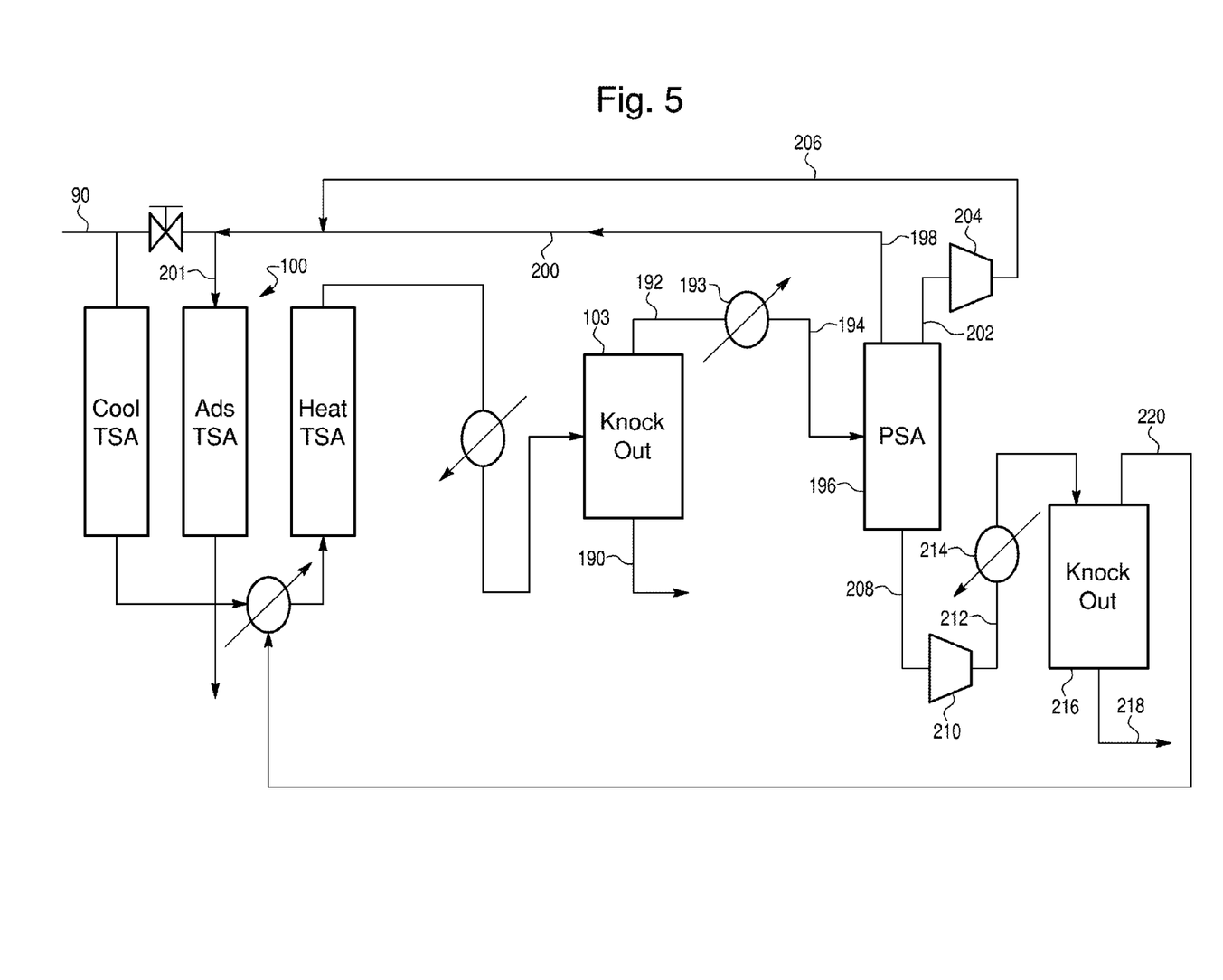
FIG. 5 is a schematic of still another variation of the process of this invention for removing water and hydrocarbons from a natural gas stream, showing the combination of TSA, gas/liquid separation and PSA unit in which an intermediate pressure stream from the PSA unit is formed.

In a final alternative embodiment shown in FIG. 5, the natural gas stream 90 which needs to be treated to remove water and heavy hydrocarbons is passed to the TSA unit 100 and the separator unit 103, as shown in FIG. 3, and discussed previously. Leaving the separator unit 103 is a liquid contaminant stream 190, containing water and heavy hydrocarbons that can be recovered for chemical value, and a gas phase 192, which still contains a minor amount of heavy hydrocarbons, $C_{5+}$. As in the previous embodiments, the gas phase 192 is heated in heater 193 and passed via line 194 to PSA unit 196. In PSA unit 196, the heavy hydrocarbons contained in stream 194 are adsorbed in the adsorbent bed of the PSA unit 196 to yield a high pressure product, gas stream 198, having a reduced content of $C_{5+}$ hydrocarbons than stream 194. In this embodiment, the high pressure product gas stream 198 is recycled to the adsorbent stage of the TSA unit 100. This is shown via lines 200 and 201. An intermediate pressure product stream 172 is also taken co-currently from the product end of the PSA unit 196. This intermediate pressure product stream 202 also has a reduced $C_{5+}$ content than stream 194 and is pressurized in compressor 204 and directed via line 206 for recycle with line 200 to the adsorbent stage of the TSA unit 100. The removal and recycle of an intermediate pressure stream from a PSA unit improves the efficiency of the PSA unit, and is shown in commonly assigned U.S. Pat. No. 6,610,124, issued Aug. 26, 2003. The low pressure, highly contaminated stream 208 which leaves PSA unit 196 is pressurized in compressor 210 and then sent via line 212 to condenser 214 for separation into a gas and liquid phase in separator 216. The liquid phase which contains heavy hydrocarbons is removed via line 218, and the gas phase via 200 can be used to heat the boiler in TSA unit 100.

Example 1

Prior Art

This example illustrates the performance of a hydrocarbon recovery system with a 12,000 kg/bed 4 bed TSA process. The system contains the prior art TSA unit and a separator. The system would be the same as in FIG. 1, in which adsorbing stage 14 would be two beds having 12,000 kg of adsorbent in each bed. Instead of the gas phase 34 from separator 30 being sent to the PSA unit, gas phase 34 is recycled to the feed charge 11. This system produces a product stream 15 that has a cricondentherm of 32° C. well short of a typical pipeline spec of −2° C. Streams are defined in Table 1 and associated with FIG. 1, as modified above.

TABLE 1

| Streams from FIG. 1 | 10 | 15 | 11 | 34 | 32 |
|---|---|---|---|---|---|
| Temp (F.) | 101.84 | 101.84 | 101.84 | 131.00 | 131.00 |
| P (psia) | 1080.00 | 1079.01 | 1080.00 | 1079.01 | 1079.01 |
| Flow (#mole/hr) | 10980.23 | 10898.05 | 10983.08 | 4137.51 | 82.17 |
| N2 | 1.1784% | 1.1860% | 1.1792% | 1.1812% | 0.1682% |
| CO2 | 1.4341% | 1.4389% | 1.4306% | 1.4215% | 0.7908% |
| C1 | 82.2058% | 82.6303% | 82.1556% | 82.0225% | 25.9616% |
| C2 | 8.9100% | 8.9152% | 8.8640% | 8.7419% | 8.2100% |
| C3 | 3.4800% | 3.4540% | 3.4341% | 3.3124% | 6.9205% |
| IC4 | 0.3900% | 0.3830% | 0.3808% | 0.3563% | 1.3175% |
| NC4 | 0.9500% | 0.9276% | 0.9222% | 0.8485% | 3.9203% |
| IC5 | 0.3200% | 0.3003% | 0.3308% | 0.3596% | 2.9356% |
| NC5 | 0.3600% | 0.3341% | 0.3680% | 0.3894% | 3.7999% |
| C6 | 0.4200% | 0.3230% | 0.4877% | 0.6672% | 13.3790% |
| NC7 | 0.2500% | 0.1069% | 0.3136% | 0.4823% | 19.2372% |
| BNZN | 0.0000% | 0.0000% | 0.0000% | 0.0000% | 0.0000% |
| NC8 | 0.1000% | 0.0001% | 0.1190% | 0.1694% | 13.3149% |
| TOLU | 0.0000% | 0.0000% | 0.0000% | 0.0000% | 0.0000% |

TABLE 1-continued

| Streams from FIG. 1 | 10 | 15 | 11 | 34 | 32 |
| --- | --- | --- | --- | --- | --- |
| NC9 | 0.0000% | 0.0000% | 0.0000% | 0.0000% | 0.0006% |
| NC10 | 0.0000% | 0.0000% | 0.0000% | 0.0000% | 0.0000% |
| Nc11 | 0.0001% | 0.0000% | 0.0001% | 0.0000% | 0.0126% |
| M-mercaptan | 0.0001% | 0.0001% | 0.0001% | 0.0001% | 0.0003% |
| H2S | 0.0004% | 0.0004% | 0.0004% | 0.0004% | 0.0004% |
| E-mercaptan | 0.0001% | 0.0001% | 0.0001% | 0.0001% | 0.0005% |
| H2O | 0.0010% | 0.0000% | 0.0136% | 0.0471% | 0.0300% |
| Meoh | 0.0000% | 0.0000% | 0.0000% | 0.0000% | 0.0000% |

Example 2

Prior Art

This example illustrates the performance of a hydrocarbon recovery system with a 27,000 kg/bed 4 bed process, as in Example 1. In this example the impact of increasing the adsorbent inventory per bed on the cricondentherm of product stream 15 is reviewed. By increasing the amount of adsorbent in each bed 14, the product 15 cricondomthermn is 21° C. Streams are defined in Table 2.

TABLE 2

| Streams from FIG. 1 | 10 | 15 | 11 | 34 | 32 |
| --- | --- | --- | --- | --- | --- |
| Temp (F.) | 101.84 | 101.84 | 101.84 | 131.00 | 131.00 |
| P (psia) | 1080.00 | 1071.89 | 1080.00 | 1071.89 | 1071.89 |
| Flow (#mole/hr | 10980.23 | 10851.04 | 11035.84 | 8355.41 | 129.18 |
| N2 | 1.1784% | 1.1903% | 1.1787% | 1.1791% | 0.1677% |
| CO2 | 1.4341% | 1.4418% | 1.4277% | 1.4193% | 0.7868% |
| C1 | 82.2058% | 82.8721% | 82.0605% | 81.8695% | 26.0015% |
| C2 | 8.9100% | 8.9193% | 8.8320% | 8.7294% | 8.2060% |
| C3 | 3.4800% | 3.4403% | 3.4066% | 3.3102% | 6.9095% |
| IC4 | 0.3900% | 0.3792% | 0.3755% | 0.3565% | 1.3147% |
| NC4 | 0.9500% | 0.9154% | 0.9065% | 0.8493% | 3.9115% |
| IC5 | 0.3200% | 0.2881% | 0.3462% | 0.3806% | 3.0929% |
| NC5 | 0.3600% | 0.3182% | 0.3823% | 0.4115% | 3.9950% |
| C6 | 0.4200% | 0.2255% | 0.6029% | 0.8433% | 16.7862% |
| NC7 | 0.2500% | 0.0091% | 0.3627% | 0.5109% | 20.1819% |
| BNZN | 0.0000% | 0.0000% | 0.0000% | 0.0000% | 0.0000% |
| NC8 | 0.1000% | 0.0000% | 0.1048% | 0.1110% | 8.6182% |
| TOLU | 0.0000% | 0.0000% | 0.0000% | 0.0000% | 0.0000% |
| NC9 | 0.0000% | 0.0000% | 0.0000% | 0.0000% | 0.0004% |
| NC10 | 0.0000% | 0.0000% | 0.0000% | 0.0000% | 0.0000% |
| Nc11 | 0.0001% | 0.0000% | 0.0001% | 0.0000% | 0.0081% |
| M-mercaptan | 0.0001% | 0.0001% | 0.0001% | 0.0001% | 0.0003% |
| H2S | 0.0004% | 0.0004% | 0.0004% | 0.0004% | 0.0004% |
| E-mercaptan | 0.0001% | 0.0001% | 0.0001% | 0.0001% | 0.0005% |
| H2O | 0.0010% | 0.0000% | 0.0130% | 0.0288% | 0.0183% |
| Meoh | 0.0000% | 0.0000% | 0.0000% | 0.0000% | 0.0000% |

Example 3

Prior Art

This example illustrates the performance of a hydrocarbon recovery system with a 35,000 kg/bed 4 bed process. In this example, the impact of further increasing the adsorbent inventory per bed on the cricondentherm of product stream 15 is considered. Now, the stream 15 cricondentherm is 19.8° C. See Table 3 for stream data. Effectively, all the gas processed is used for regeneration, compare flows of streams 10 and 34.

TABLE 3

| Streams from FIG. 1 | 10 | 15 | 11 | 34 | 32 |
|---|---|---|---|---|---|
| Temp (F.) | 101.84 | 101.84 | 101.84 | 131.00 | 131.00 |
| P (psia) | 1080.00 | 1064.28 | 1080.00 | 1064.29 | 1064.29 |
| Flow (#mole/hr | 10980.23 | 10835.02 | 11072.97 | 10336.16 | 145.21 |
| N2 | 1.1784% | 1.1919% | 1.1782% | 1.1780% | 0.1667% |
| CO2 | 1.4341% | 1.4429% | 1.4264% | 1.4182% | 0.7825% |
| C1 | 82.2058% | 82.9594% | 82.0093% | 81.8005% | 25.9028% |
| C2 | 8.9100% | 8.9214% | 8.8192% | 8.7227% | 8.1830% |
| C3 | 3.4800% | 3.4360% | 3.3966% | 3.3081% | 6.8960% |
| IC4 | 0.3900% | 0.3780% | 0.3737% | 0.3563% | 1.3130% |
| NC4 | 0.9500% | 0.9114% | 0.9010% | 0.8489% | 3.9070% |
| IC5 | 0.3200% | 0.2824% | 0.3537% | 0.3896% | 3.1651% |
| NC5 | 0.3600% | 0.3110% | 0.3895% | 0.4208% | 4.0843% |
| C6 | 0.4200% | 0.1632% | 0.6779% | 0.9519% | 18.9564% |
| NC7 | 0.2500% | 0.0019% | 0.3610% | 0.4789% | 18.9304% |
| BNZN | 0.0000% | 0.0000% | 0.0000% | 0.0000% | 0.0000% |
| NC8 | 0.1000% | 0.0000% | 0.0995% | 0.0989% | 7.6872% |
| TOLU | 0.0000% | 0.0000% | 0.0000% | 0.0000% | 0.0000% |
| NC9 | 0.0000% | 0.0000% | 0.0000% | 0.0000% | 0.0003% |
| NC10 | 0.0000% | 0.0000% | 0.0000% | 0.0000% | 0.0000% |
| Nc11 | 0.0001% | 0.0000% | 0.0001% | 0.0000% | 0.0072% |
| M-mercaptan | 0.0001% | 0.0001% | 0.0001% | 0.0001% | 0.0003% |
| H2S | 0.0004% | 0.0004% | 0.0004% | 0.0004% | 0.0004% |
| E-mercaptan | 0.0001% | 0.0001% | 0.0001% | 0.0001% | 0.0005% |
| H2O | 0.0010% | 0.0000% | 0.0135% | 0.0267% | 0.0169% |
| Meoh | 0.0000% | 0.0000% | 0.0000% | 0.0000% | 0.0000% |

Example 4

Prior Art

This example illustrates the performance of a hydrocarbon recovery system with a 39,750 kg/bed 4 bed process, as in Example 1. In this case, a recycle is introduced that takes the amount of gas required for regeneration beyond what is available in the feed. This could be done with the introduction of a high pressure blower. However, there is no further improvement in the cricondentherm specification of stream 15, as in this case the cricondentherm is still 19.8° C. See Table 4 for stream data.

Example 5

Invention

In this case, a PSA is added to the TSA unit on a hydrocarbon recovery system with a 12,000 kg/bed 4 bed process as illustrated in FIG. 4. In this case, the cricondentherm of the combined product streams 134 and 160 is 10° C., still short of the cricondentherm specification of −2° C., but illustrating the improvement of the process of putting a PSA on the regeneration stream of the TSA unit. See Table 5.

TABLE 4

| Streams from FIG. 1 | 10 | 15 | 11 | 34 | 32 |
|---|---|---|---|---|---|
| Temp (F.) | 101.84 | 101.84 | 101.84 | 131.00 | 131.00 |
| P (psia) | 1080.00 | 1057.78 | 1080.00 | 1057.79 | 1057.79 |
| Flow (#mole/hr | 10980.23 | 10827.83 | 11098.37 | 11597.93 | 152.39 |
| N2 | 1.1785% | 1.1927% | 1.1781% | 1.1776% | 0.1657% |
| CO2 | 1.4342% | 1.4434% | 1.4257% | 1.4177% | 0.7790% |
| C1 | 82.2056% | 82.9996% | 81.9787% | 81.7638% | 25.7931% |
| C2 | 8.9100% | 8.9218% | 8.8120% | 8.7193% | 8.1611% |
| C3 | 3.4800% | 3.4334% | 3.3911% | 3.3070% | 6.8861% |
| IC4 | 0.3900% | 0.3773% | 0.3726% | 0.3562% | 1.3123% |
| NC4 | 0.9500% | 0.9092% | 0.8980% | 0.8487% | 3.9062% |
| IC5 | 0.3200% | 0.2802% | 0.3570% | 0.3920% | 3.1879% |
| NC5 | 0.3600% | 0.3080% | 0.3924% | 0.4231% | 4.1113% |
| C6 | 0.4200% | 0.1330% | 0.7270% | 1.0177% | 20.3113% |
| NC7 | 0.2500% | 0.0008% | 0.3559% | 0.4562% | 18.0878% |
| BNZN | 0.0000% | 0.0000% | 0.0000% | 0.0000% | 0.0000% |
| NC8 | 0.1000% | 0.0000% | 0.0965% | 0.0932% | 7.2729% |
| TOLU | 0.0000% | 0.0000% | 0.0000% | 0.0000% | 0.0000% |
| NC9 | 0.0000% | 0.0000% | 0.0000% | 0.0000% | 0.0003% |
| NC10 | 0.0000% | 0.0000% | 0.0000% | 0.0000% | 0.0000% |
| Nc11 | 0.0001% | 0.0000% | 0.0001% | 0.0000% | 0.0068% |
| M-mercaptan | 0.0001% | 0.0001% | 0.0001% | 0.0001% | 0.0003% |
| H2S | 0.0004% | 0.0004% | 0.0004% | 0.0004% | 0.0004% |
| E-mercaptan | 0.0001% | 0.0001% | 0.0001% | 0.0001% | 0.0005% |
| H2O | 0.0010% | 0.0000% | 0.0143% | 0.0268% | 0.0169% |
| Meoh | 0.0000% | 0.0000% | 0.0000% | 0.0000% | 0.0000% |

TABLE 5

| | Streams from FIG. 4 | | | | | |
|---|---|---|---|---|---|---|
| | 130 | 134 | 146 | 182 | 152 | 151 |
| Temp (F.) | 101.84 | 101.84 | 131 | 131 | 131.05 | 131.05 |
| P (psia) | 1080 | 1080 | 1076.57 | 1077 | 1076.57 | 1076.57 |
| Flow (#mole/hr) | 10980.23 | 10907.3 | 4052.53 | 278.89 | 4293.55 | 37.88 |
| N2 | 1.18% | 1.19% | 1.16% | 1.23% | 1.18% | 0.17% |
| CO2 | 1.43% | 1.44% | 1.42% | 1.35% | 1.42% | 0.79% |
| C1 | 82.21% | 82.78% | 81.25% | 81.95% | 81.78% | 26.03% |
| C2 | 8.91% | 8.97% | 8.81% | 7.65% | 8.74% | 8.21% |
| C3 | 3.48% | 3.50% | 3.44% | 2.38% | 3.34% | 6.96% |
| IC4 | 0.39% | 0.39% | 0.39% | 0.46% | 0.38% | 1.40% |
| NC4 | 0.95% | 0.96% | 0.94% | 0.99% | 0.91% | 4.20% |
| IC5 | 0.32% | 0.27% | 0.41% | 1.23% | 0.44% | 3.53% |
| NC5 | 0.36% | 0.30% | 0.46% | 1.15% | 0.47% | 4.55% |
| C6 | 0.42% | 0.19% | 0.81% | 1.12% | 0.71% | 14.06% |
| NC7 | 0.25% | 0.01% | 0.65% | 0.25% | 0.47% | 18.41% |
| BNZN | 0.00% | 0.00% | 0.00% | 0.00% | 0.00% | 0.00% |
| NC8 | 0.10% | 0.00% | 0.27% | 0.04% | 0.15% | 11.66% |
| TOLU | 0.00% | 0.00% | 0.00% | 0.00% | 0.00% | 0.00% |
| NC9 | 0.00% | 0.00% | 0.00% | 0.00% | 0.00% | 0.00% |
| NC10 | 0.00% | 0.00% | 0.00% | 0.00% | 0.00% | 0.00% |
| NC11 | 0.00% | 0.00% | 0.00% | 0.00% | 0.00% | 0.02% |
| M-mercaptan | 0.00% | 0.00% | 0.00% | 0.00% | 0.00% | 0.00% |
| H2S | 0.00% | 0.00% | 0.00% | 0.00% | 0.00% | 0.00% |
| E-mercaptan | 0.00% | 0.00% | 0.00% | 0.00% | 0.00% | 0.00% |
| H2O | 0.00% | 0.00% | 0.00% | 0.18% | 0.01% | 0.01% |
| Meoh | 0.00% | 0.00% | 0.00% | 0.00% | 0.00% | 0.00% |

| | Streams from FIG. 4 | | | | | |
|---|---|---|---|---|---|---|
| | 160 | 159 | 162 | 170 | 157 | 180 |
| Temp (F.) | 350 | 350 | 255.49 | 131 | | 131 |
| P (psia) | 1077 | 40 | 20 | 40 | | 1077 |
| Flow (#mole/hr) | 3914.88 | 229.52 | 149.14 | 35.32 | 9.06 | 65.97 |
| N2 | 1.20% | 1.08% | 0.71% | 0.00% | 1.08% | 0.19% |
| CO2 | 1.45% | 1.30% | 0.86% | 0.03% | 1.30% | 0.76% |
| C1 | 83.42% | 74.97% | 49.44% | 0.82% | 74.97% | 27.24% |
| C2 | 8.91% | 8.01% | 5.28% | 0.38% | 8.01% | 7.35% |
| C3 | 3.41% | 3.06% | 2.02% | 0.43% | 3.06% | 4.97% |
| IC4 | 0.36% | 0.75% | 0.49% | 0.22% | 0.75% | 1.67% |
| NC4 | 0.85% | 1.79% | 1.18% | 0.69% | 1.79% | 4.43% |
| IC5 | 0.19% | 1.96% | 4.52% | 5.04% | 1.96% | 9.33% |
| NC5 | 0.21% | 2.11% | 4.87% | 6.43% | 2.11% | 10.28% |
| C6 | 0.02% | 2.60% | 16.02% | 37.68% | 2.60% | 20.51% |
| NC7 | 0.00% | 1.75% | 10.79% | 35.08% | 1.75% | 10.52% |
| BNZN | 0.00% | 0.00% | 0.00% | 0.00% | 0.00% | 0.00% |
| NC8 | 0.00% | 0.57% | 3.48% | 13.19% | 0.57% | 2.62% |
| TOLU | 0.00% | 0.00% | 0.00% | 0.00% | 0.00% | 0.00% |
| NC9 | 0.00% | 0.00% | 0.00% | 0.00% | 0.00% | 0.00% |
| NC10 | 0.00% | 0.00% | 0.00% | 0.00% | 0.00% | 0.00% |
| NC11 | 0.00% | 0.00% | 0.00% | 0.00% | 0.00% | 0.00% |
| M-mercaptan | 0.00% | 0.00% | 0.00% | 0.00% | 0.00% | 0.01% |
| H2S | 0.00% | 0.00% | 0.00% | 0.00% | 0.00% | 0.00% |
| E-mercaptan | 0.00% | 0.00% | 0.00% | 0.00% | 0.00% | 0.00% |
| H2O | 0.00% | 0.05% | 0.33% | 0.01% | 0.05% | 0.12% |
| Meoh | 0.00% | 0.00% | 0.00% | 0.00% | 0.00% | 0.00% |

Example 6

Invention

In this case, a PSA unit is added to the TSA unit as in Example 5, with a 21,000 kg bed 4 bed process as illustrated in FIG. 4. In this case, the cricondentherm of the combined streams 134 and 160 is −2.3° C., satisfying the cricondentherm specification of −2° C. and illustrating the improvement of the process of putting a PSA on the regeneration stream of the TSA. An important consideration is also the amount of C5+ liquids produced in this process 111.6 # mole/hr is produced vs 76.7 # mole/hr for Example 5. The incremental C5+ production is substantial and can be used to pay for the plant. Typically C5+ condensate trades at a premium to a barrel of oil far above its value as a gas.

TABLE 6

| | Streams from FIG. 4 | | | | | |
|---|---|---|---|---|---|---|
| | 130 | 134 | 146 | 182 | 152 | 151 |
| Temp (F.) | 101.84 | 101.84 | 131 | 131 | 131 | 131 |
| P (psia) | 1080 | 1080 | 1076.6 | 1077 | 1076.6 | 1076.6 |
| Flow (#mole/hr | 10980.2 | 10873.2 | 6215.2 | 426.4 | 6638.6 | 3 |
| N2 | 1.18% | 1.19% | 1.17% | 1.23% | 1.17% | 0.17% |
| CO2 | 1.43% | 1.45% | 1.42% | 1.35% | 1.42% | 0.79% |
| C1 | 82.21% | 83.05% | 81.58% | 81.99% | 81.63% | 26.05% |
| C2 | 8.91% | 9.00% | 8.84% | 7.67% | 8.77% | 8.25% |
| C3 | 3.48% | 3.51% | 3.45% | 2.39% | 3.38% | 7.05% |
| IC4 | 0.39% | 0.39% | 0.39% | 0.46% | 0.39% | 1.44% |
| NC4 | 0.95% | 0.96% | 0.94% | 0.99% | 0.94% | 4.33% |
| IC5 | 0.32% | 0.20% | 0.41% | 1.22% | 0.46% | 3.70% |
| NC5 | 0.36% | 0.23% | 0.46% | 1.15% | 0.50% | 4.83% |
| C6 | 0.42% | 0.01% | 0.73% | 1.13% | 0.75% | 14.78% |
| NC7 | 0.25% | 0.00% | 0.44% | 0.25% | 0.42% | 16.34% |
| BNZN | 0.00% | 0.00% | 0.00% | 0.00% | 0.00% | 0.00% |
| NC8 | 0.10% | 0.00% | 0.17% | 0.04% | 0.16% | 12.21% |
| TOLU | 0.00% | 0.00% | 0.00% | 0.00% | 0.00% | 0.00% |
| NC9 | 0.00% | 0.00% | 0.00% | 0.00% | 0.00% | 0.00% |
| NC10 | 0.00% | 0.00% | 0.00% | 0.00% | 0.00% | 0.00% |
| Nc11 | 0.00% | 0.00% | 0.00% | 0.00% | 0.00% | 0.06% |
| M-mercaptan | 0.00% | 0.00% | 0.00% | 0.00% | 0.00% | 0.00% |
| H2S | 0.00% | 0.00% | 0.00% | 0.00% | 0.00% | 0.00% |
| E-mercaptan | 0.00% | 0.00% | 0.00% | 0.00% | 0.00% | 0.00% |
| H2O | 0.00% | 0.00% | 0.00% | 0.13% | 0.01% | 0.01% |
| Meoh | 0.00% | 0.00% | 0.00% | 0.00% | 0.00% | 0.00% |

| | Streams from FIG. 4 | | | | | |
|---|---|---|---|---|---|---|
| | 160 | 159 | 162 | 170 | 157 | 180 |
| Temp (F.) | 350 | 350 | 255.42 | 131 | | 131 |
| P (psia) | 1077 | 40 | 20 | 40 | | 1077 |
| Flow (#mole/hr | 6051.5 | 355.6 | 231.5 | 54.2 | 13.8 | 106.2 |
| N2 | 1.20% | 1.07% | 0.71% | 0.00% | 1.07% | 0.19% |
| CO2 | 1.45% | 1.30% | 0.85% | 0.03% | 1.30% | 0.76% |
| C1 | 83.28% | 74.66% | 49.15% | 0.81% | 74.66% | 27.31% |
| C2 | 8.94% | 8.02% | 5.28% | 0.38% | 8.02% | 7.35% |
| C3 | 3.45% | 3.09% | 2.04% | 0.43% | 3.09% | 4.98% |
| IC4 | 0.36% | 0.77% | 0.50% | 0.23% | 0.77% | 1.69% |
| NC4 | 0.88% | 1.85% | 1.22% | 0.71% | 1.85% | 4.49% |
| IC5 | 0.20% | 2.05% | 4.73% | 5.28% | 2.05% | 9.59% |
| NC5 | 0.22% | 2.24% | 5.17% | 6.83% | 2.24% | 10.68% |
| C6 | 0.02% | 2.74% | 16.85% | 39.82% | 2.74% | 21.08% |
| NC7 | 0.00% | 1.56% | 9.60% | 31.45% | 1.56% | 9.11% |
| BNZN | 0.00% | 0.00% | 0.00% | 0.00% | 0.00% | 0.00% |
| NC8 | 0.00% | 0.60% | 3.66% | 14.00% | 0.60% | 2.67% |
| TOLU | 0.00% | 0.00% | 0.00% | 0.00% | 0.00% | 0.00% |
| NC9 | 0.00% | 0.00% | 0.00% | 0.00% | 0.00% | 0.00% |
| NC10 | 0.00% | 0.00% | 0.00% | 0.00% | 0.00% | 0.00% |
| Nc11 | 0.00% | 0.00% | 0.00% | 0.01% | 0.00% | 0.00% |
| M-mercaptan | 0.00% | 0.00% | 0.00% | 0.00% | 0.00% | 0.01% |
| H2S | 0.00% | 0.00% | 0.00% | 0.00% | 0.00% | 0.00% |
| E-mercaptan | 0.00% | 0.00% | 0.00% | 0.00% | 0.00% | 0.00% |
| H2O | 0.00% | 0.04% | 0.23% | 0.01% | 0.04% | 0.09% |
| Meoh | 0.00% | 0.00% | 0.00% | 0.00% | 0.00% | 0.00% |

Example 7

Invention

For a feed as described by stream 10 in FIG. 1, fugacity coefficients are illustrated at various temperatures for the n-pentane, n-hexane, n-heptane, n-octane as a function of temperature and pressure. Table 7 gives fugacity coefficient vs temperature for various components at two pressures for stream 10 in FIG. 1.

As can be seen in Table 7 at high pressure and elevated temperatures (350° F.), the fugacity coefficients increase by up to an order of magnitude relative to 70° F. and high pressure. Contrarily at low pressure all components have fugacity coefficients at all temperatures that are approximately 1. Since the driving force for separation in a PSA is change in partial pressure, more precisely, partial pressure×the fugacity coefficient, it should be clear that higher temperature operation of the PSA will enable greater changes in driving force when changing the pressure across the PSA cycle. The greater change in driving force across the PSA cycle will allow for smaller adsorbent inventories and better performance.

TABLE 7

| | Pressure(psia) | | |
|---|---|---|---|
| | 1080 | 1080 | 1080 |
| | | Temp(F.) | |
| | 350° F. | 150° F. | 70° F. |
| | | Fugacity Coefficient | |
| n-pentane | 0.6631 | 0.3354 | 0.1658 |
| n-hexane | 0.6061 | 0.2629 | 0.1105 |
| n-heptane | 0.5578 | 0.2095 | 0.07564 |
| n-octane | 0.5125 | 0.1659 | 0.05121 |
| | Pressure(psia) | | |
| | 15 | 15 | 15 |
| | | Temp(F.) | |
| | 350° F. | 150° F. | 70° F. |
| | | Fugacity Coefficient | |
| n-pentane | 0.9937 | 0.9848 | 0.9799 |
| n-hexane | 0.9923 | 0.9814 | 0.9723 |
| n-heptane | 0.9911 | 0.9783 | 0.9677 |
| n-octane | 0.9897 | 0.975 | 0.9628 |

The invention claimed is:

1. A process for removing heavy hydrocarbons from a natural gas stream comprising:
    directing a natural gas stream containing water and $C_{5+}$ hydrocarbons to the adsorbent bed of a thermal swing adsorption (TSA) unit, so as to adsorb at least a portion of the water and $C_{5+}$ hydrocarbons from said natural gas feedstream to produce a first product gas stream which has a reduced level of water and $C_{5+}$ hydrocarbons than said feedstream, regenerating said adsorbent bed by heating to remove adsorbed water and $C_{5+}$ hydrocarbons and form a second gas stream having a higher concentration of water and $C_{5+}$ hydrocarbons than said feedstream;
    cooling said second gas stream to form liquid water and liquid $C_{5+}$ hydrocarbons and separating said liquids from said second gas stream to form a third gas stream;
    directing said third gas stream to an adsorbent bed of a pressure swing adsorption (PSA) unit so as to adsorb $C_{5+}$ hydrocarbons from said third gas stream and yield a high pressure second product gas stream having a lower concentration of $C_{5+}$ hydrocarbons than said third gas stream;
    regenerating said adsorbent bed in said PSA unit by lowering the pressure and forming a low pressure contaminant gas stream containing $C_{5+}$ hydrocarbons.

2. The process of claim 1, wherein said low pressure contaminant gas stream from said PSA unit is used as fuel for heating said adsorbent bed of said TSA unit.

3. The process of claim 1, wherein said high pressure second product gas stream is recycled to said adsorbent bed of said TSA unit.

4. The process of claim 1, wherein said low pressure contaminant stream is cooled to condense $C_{5+}$ hydrocarbon liquids from said low pressure contaminant gas stream, separating and recovering said liquids from said low pressure contaminant gas stream to form a light hydrocarbon gas stream.

5. The process of claim 4, wherein said light hydrocarbon gas stream is used as fuel to heat and regenerate the adsorbent bed of said TSA unit.

6. The process of claim 4, wherein said low pressure contaminant gas stream is pressurized prior to said cooling.

7. The process of claim 4, wherein said high pressure product stream is recycled to the adsorbent bed of said TSA unit.

8. The process of claim 4, wherein a portion of said light hydrocarbon gas stream is combined with said second gas stream prior to cooling said second gas stream.

9. The process of claim 8, wherein a portion of said third gas stream is used as fuel to heat and regenerate said adsorbent bed of said TSA unit.

10. The process of claim 8, wherein said high pressure second product stream is recycled to the adsorbent bed of said TSA unit.

11. The process of claim 9, wherein said high pressure second product gas stream is recycled to the adsorbent bed of said TSA unit.

12. The process of claim 1, comprising forming an intermediate pressure gas stream from said PSA unit co-current with the flow of said high pressure second product stream, recycling said intermediate pressure stream to the adsorbent bed of said TSA unit.

13. The process of claim 12, wherein said intermediate pressure gas stream is mixed with said high pressure second product gas stream to form a recyclable mixture, and directing said mixture to said adsorbent bed of said TSA unit.

14. The process of claim 1, wherein a portion of said natural gas feedstream is heated and directed to said adsorbent bed of said TSA to regenerate said adsorbent bed.

15. The process of claim 1, wherein said adsorbent bed of said TSA unit and said PSA unit is selected from silica, silica gel, alumina, silica-alumina, and zeolite adsorbents.

16. The process of claim 1, wherein said first product gas stream, said high pressure second product gas stream or both of said gas streams are sent to a natural gas pipeline.

17. The process of claim 4, wherein said light hydrocarbon gas stream is cooled to separate and recover a liquid C5+ hydrocarbon stream from said light hydrocarbon gas stream.

18. The process of claim 1, comprising forming an intermediate pressure gas stream from said PSA unit co-current with flow of said high pressure second product stream.

19. The process of claim 1, wherein said PSA adsorbs at a temperature of at least 65° C. and a pressure of at least 500 psia.

20. The process of claim 19, wherein said PSA adsorbs at a temperature of at least 150° C. and a pressure of at least 800 psia.

21. A process of removing heavy hydrocarbons from a natural gas stream containing a major amount of methane and a minor amount of heavy hydrocarbons comprising:
    directing said natural gas stream to an adsorbent bed of a pressure swing adsorption (PSA) unit so as to adsorb $C_{5+}$ hydrocarbons from said natural gas stream and yield a product gas stream having a higher concentration of methane and lower concentration of $C_{5+}$ hydrocarbons than said natural gas stream; said PSA unit adsorbing at a temperature of at least 65° C. and a pressure of at least 500 psia;
    regenerating said adsorbent bed in said PSA unit by lowering the pressure and forming a low pressure contamination gas stream containing $C_{5+}$ hydrocarbons.

22. The process of claim 21, wherein said PSA unit adsorbs at a temperature of at least 125° C. and a pressure of at least 500 psia.

* * * * *